Aug. 23, 1938.  A. L. V. C. DEBRIE  2,127,768
FRICTION DRIVING DEVICE
Filed Nov. 2, 1937  2 Sheets-Sheet 1
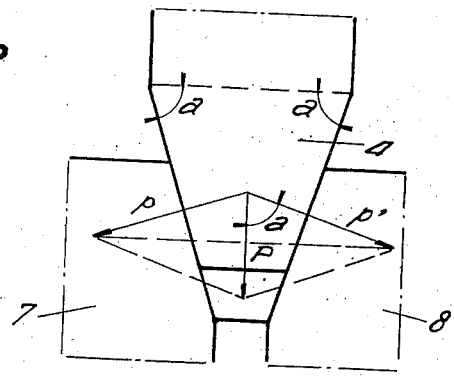
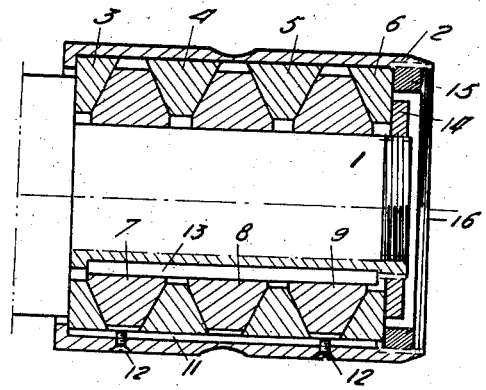
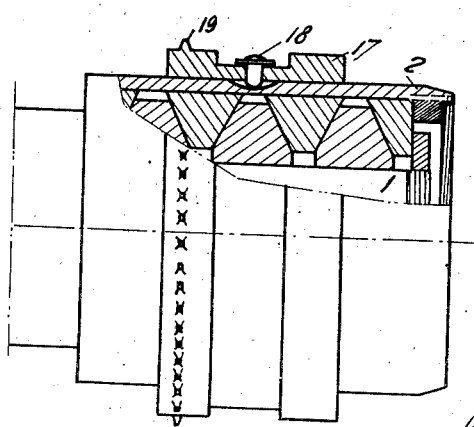

Aug. 23, 1938.  A. L. V. C. DEBRIE  2,127,768
FRICTION DRIVING DEVICE
Filed Nov. 2, 1937   2 Sheets-Sheet 2
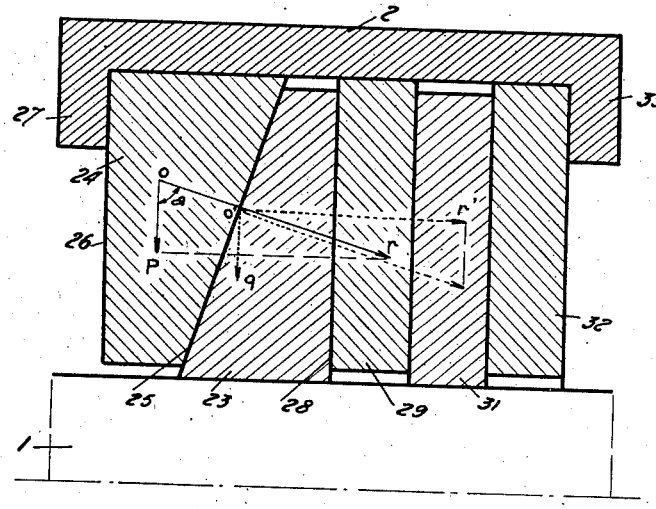
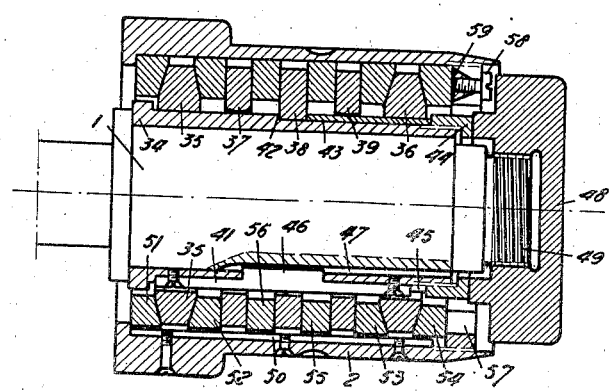

Patented Aug. 23, 1938

2,127,768

UNITED STATES PATENT OFFICE 2,127,768

FRICTION DRIVING DEVICE

André Leon Victor Clement Debrie, Paris, France

Application November 2, 1937, Serial No. 172,444
In France November 16, 1936

10 Claims. (Cl. 64—30)

It is already known to drive by friction a rotating member, say a hob, by means of a rotating shaft. The hob lies on the shaft and the friction between them is a consequence of the weight of said hob and of the members connected therewith, and results in the hob being rotated by the shaft, said rotation ceasing and the hob sliding on the shaft, when the resisting strain reaches a determined value. Such a device may be more particularly, but not exclusively, used for rolling cinematographic films on coils.

The friction is proportional to the product of the weight by the coefficient of friction. It is thus necessary to vary one of said quantities, or both, in order to give to the driving strain the desired value.

Now the weight may be varied only between certain limits, and moreover its determination depends on many considerations which are in no way related with the friction. As for the coefficient of friction, it may be given only determined values by a suitable choice of the materials the surfaces of which are rubbing on each other, but it is impossible to vary it in a continuous way.

The object of my present invention is to provide a friction driving device allowing to predetermine very acutely the driving strain, and characterized by that the driving and driven members, say the shaft and hob, lay on each other with the interposition of rings some or all of which contact by frustoconical faces, the axis of said cones being that of the shaft; said rings are slidably connected alternatively the ones with the shaft, the others with the hob and penetrate between one another in such a way that a pressure occurs between the frustoconical faces as a consequence of the weight, the rings connected with the hob operating substantially as a wedge producing pressures on the faces of the adjacent rings connected with the shaft. The friction produced by said pressure, and thus the driving strain, depends then on the angle of the generatrices of the cones with the axis, and consequently it is possible to determine it acutely when designing the device.

The following disclosure indicates by way of examples some embodiments of the invention with reference to the accompanying drawings in which:

Fig. 1 is a cross-section of a shaft and a hob connected according to the invention.

Fig. 2 is a diagram showing how the pressures are exerted between the ring faces.

Fig. 3 is a cross-section of a device according to the invention for driving a film without rolling it.

Fig. 4 is a diagram showing the pressures in a modification of the device represented in Fig. 1 and Fig. 5 shows such a modification in cross-section.

In Fig. 1 the shaft 1 supports a hob 2 with interposition of rings 3, 4, 5, 6 provided with frustoconical faces and connected with the hob so as to rotate therewith, and of similarly shaped rings 7, 8, 9 rotating with the shaft, said rings penetrating between each other so that the rings 3, 4, 5, 6 connected with the hob bear by their conical faces on the similar faces of the rings 7, 8, 9 connected with the shaft.

The operation of the device will be easily understood by referring to Fig. 2 wherein is shown a single ring 4 penetrating between to other rings 7 and 8.

If P is the weight supported by the ring 4, viz, the weight of the hob and of the members, say a film coil, connected therewith; if $a$ is the angle of the generatrices of the frustocones forming the faces of the rings with the axis of the shaft; it is possible to decompose the weight P into two component pressures $p$ and $p'$ normal to the ring faces, the value of which is:

$$p = p' = \frac{P}{2 \cos a}$$

If $f$ is the coefficient of friction between said rings, the driving friction strain will be:

$$2pf = \frac{Pf}{\cos a}$$

It is therefore possible to give to said strain any desired value, greater than $Pf$, by determining conveniently the angle $a$; it is a real adjustment when manufacturing the device.

It should be sometimes possible to use a device as shown in Fig. 2, with a single set of rings; but generally it is preferred to use several such sets, say as represented in Fig. 1, four rings 3 to 6 connected with the hob and three rings 7 to 9 connected with the shaft. But in such a case it is necessary that each ring may operate in its own way, independently of the others, it is for that purpose that said rings can slightly slide axially along the shaft and inside the hob, their axial displacement being limited by an adjusting device.

The Fig. 1 shows how this may be made.

The rings 3 to 6 are each provided with a slot allowing to engage them slidably on a key 11 fixed in the hob by screws 12, similarly, the rings 7 to 9 are provided with a slot allowing to engage them slidably on a key 13 fastened on the shaft 1. Ordinary rings, with parallel faces 14 and 15 are screwed on the shaft, and a plate 16 closes the device.

The setting up is made in the following way; the keys 11 and 13 are fixed in their places, then the hob 2 is disposed round the shaft and the first ring 3 is put in its place and the other rings are slid on the keys 11 and 13 in the following order 4, 8, 5, 9 and 6. The clearance is then adjusted by screwing suitably the rings 14 and 15, and finally the closing plate 16 is fixed.

By way of example and although the invention is not limited to cinematographic industry, the Fig. 3 shows a device allowing to drive a film without rolling it.

The hob 2 is disposed on the shaft 1 with interposition of frustoconical rings as shown in Fig. 1, but on said hob a ring 17 is set, say by means of a spigot 18; near one of its edges said ring is provided with sprockets 19 which drive the film, kept in contact with the ring 17 by means of a convenient device, say a roller not shown in the figure.

The above indicated formula shows that the driving strain is the greater as the angle $a$ is nearer to 90°. Thus if a considerable strain is to be obtained it would be necessary to give such a value to said angle but in such conditions the friction would be irregular and the rings may be jammed together, especially when the driven member is rather heavy, what occurs at the end of the rolling when said member is a coil for cinematographic films; in such a case the strain might become great enough to break the film, if it was held back for any reason.

The modification shown in Figures 4 and 5 avoids said drawback.

It consists in using frustoconical rings the angle of which is smaller, in combination with other rings both faces of which are plane and perpendicular to the axis; these rings being urged against each other by the effect of the pressure exerted by the frustoconical faces as consequence of the weight of the driven member; the friction occurring then as well between the frustoconical faces as between the plane ones.

The operation of such a device is now explained with reference to Fig. 4.

Between the shaft 1 and the hob 2 are interposed rings 23 and 24 having each a plane face 26 or 28 and a frustoconical one 25 by which they are contacting.

The ring 23 is slidably connected with the shaft 1 and the ring 24 is slidably connected inside the hob by means of keys not shown in the figure.

The ring 24 bears by its plane face on a stop 27, say fastened to the hob, the ring 23 bears by its plane face against a ring 29 both faces of which are plane, and which at its turn bears on similar rings 31 and 32, all slidably connected with the hob or the shaft, but rotatably driven, the rings 29 and 32 by the hob and the ring 31 by the shaft. The ring 32 bears on a stop 33 fastened on the hob.

The device operates in the following way.

The weight OP of the hob and of the members connected therewith, say a film coil, applied on ring 24 tends to lower the same, which in these conditions exerts on the ring 23 a pressure $Op$ normal to the conical contact surface 25 given by:

$$Op = \frac{OP}{\cos a}$$

this pressure results in a first friction strain $$f \times \frac{OP}{\cos a}$$

in consequence of which the shaft tends to drive the hob. But, besides, the pressure $O'p'$ exerted in $O'$ on the frustoconical face 25 of the ring 23 may be decomposed into a vertical strength $O'q$ and an horizontal one $O'p'$ which will obviously have for its value:

$$O'p' = OP \times tg\ a$$

and the effect of which will be to urge the ring 23 against the ring 29, producing thus by friction between the plane faces 28 a driving strain the value of which will be:

$$f \times OP \times tg\ a$$

Further said horizontal force will urge against each other the rings 29, 31 and 32 so that on each contact surface will be produced a friction driving strain equal to $f \times OP \times tg\ a$. Finally the total friction driving strain will be:

$$f \times \overline{OP}\left(\frac{1}{\cos a} + n\ tg\ a\right)$$

$n$ being the number of the plane contact surfaces.

Thus by a convenient determination of the number $n$ of plane contact surfaces it is possible to obtain the desired driving strain with a predetermined value of the angle $a$, which will be no more necessarily near to 90°.

The Fig. 5 shows in cross-section a form of execution of the above modification.

On the shaft 1 is fastened a socket 34 on which bear two rings 35 and 36 both faces of which are frustoconical, and the rings 37, 38 and 39 both faces of which are plane, a key 41 connected with the socket is disposed in a slot provided in said rings, the ring 38 is blocked on a shoulder 42 of the socket 34 by means of a rib 43 and of a nut 44. In said rib is provided a hollow part 45 for the key 41, which is itself provided with a heel 46 penetrating in a slot 47 of the shaft 1. An outer nut 48 screwed on the threaded end part 49 of the shaft 1 keeps the different parts blocked.

The inside of the hob 2 supporting the member to be driven, say a film coils, is provided with a key 50 engaged in slots of rings 51, 52, 53, 54 having each a conical face and a plane face, and of rings 55, 56 both faces of which are plane.

An extensible nut 57 allows to adjust the axial clearance of the set of rings. The blocking of said nut is produced say by means of a screw 58 engaged in a hollow cone 59 provided in a hollow part of the nut, the displacement of said cone produced by the screw opens the nut split on that point.

It is obvious that the above devices have been described only by way of examples and that it would be possible to modify them without extending the scope of the invention.

What I claim is:

1. A friction driving device wherein a driving rotating shaft supports a hob connected with the members to be driven, comprising rings contacting with each other interposed between the hob and the shaft and alternatively connected the ones with the hob and the others with the shaft some at least of said rings presenting frustoconical contacting faces, the axis of said frustocones being that of the shaft and the angle between the generatrices and said axis being so determined in accordance with the weight of the hob and the coefficient of friction of the contacting faces, that the driving strain may have a predetermined value.

2. A friction driving device wherein a driving rotating shaft supports a hob connected with the members to be driven, comprising rings contacting with each other interposed between the hob and the shaft and alternatively connected the ones with the hob and the others with the shaft, the extreme rings presenting each an outer plane face perpendicular to the shaft axis and an inner frustoconical face, stops fixed on the driving device on which bear said plane faces of the extreme rings; all the other rings presenting each two frustoconical contacting faces, the axis of said frustocones being that of the shaft and the angle between the generatrices and said axis being so determined in accordance with the weight of the hob and the coefficient of friction of the contacting faces, that the driving strain may have a predetermined value.

3. A friction driving device wherein a driving rotating shaft supports a hob connected with the members to be driven, comprising rings contacting with each other interposed between the hob and the shaft and alternatively connected the ones with the hob and the others with the shaft, some of the contacting faces of the rings being plane and perpendicular to the axis, the other faces being frustoconical; the axis of said frustocones being that of the shaft and the angle between the generatrices and said axis being so determined in accordance with the weight of the hob and the coefficient of friction of the contacting faces that the driving strain may have a predetermined value.

4. A friction driving device wherein a driving rotating shaft supports a hob connected with the members to be driven comprising rings contacting with each other interposed between the hob and the shaft, means for slidably connecting said rings alternatively the ones with the hob the other with the shaft, means for adjusting the axial clearance of said rings, some at least of said rings presenting frustoconical contacting faces, the axis of said frustocones being that of the shaft and the angle between the generatrices and said axis being so determined in accordance with the weight of the hob and the coefficient of friction of the contacting faces, that the driving strain may have a predetermined value.

5. A friction driving device wherein a driving rotating shaft supports a hob connected with the members to be driven comprising rings contacting with each other interposed between the hob and the shaft, means for slidably connecting said rings alternatively the ones with the hob the other with the shaft, means for adjusting the axial clearance of said rings, the extreme rings presenting each an outer plane face perpendicular to the shaft axis and an inner frustoconical face, stops fixed on the driving device on which bear said plane faces of the extreme rings; all the other rings presenting each two frustoconical contacting faces, the axis of said frustocones being that of the shaft and the angle between the generatrices and said axis being so determined in accordance with the weight of the hob and the coefficient of friction of the contacting faces, that the driving strain may have a predetermined value.

6. A friction driving device wherein a driving rotating shaft supports a hob connected with the members to be driven, comprising rings contacting with each other interposed between the hob and the shaft, means for slidably connecting said rings alternatively the ones with the hob the other with the shaft, means for adjusting the axial clearance of said rings, some of the contacting faces of the rings being plane and perpendicular to the axis, the other faces being frustoconical; the axis of said frustocones being that of the shaft and the angle between the generatrices and said axis being so determined in accordance with the weight of the hob and the coefficient of friction of the contacting faces that the driving strain may have a predetermined value.

7. A friction driving device wherein a driving rotating shaft supports a hob connected with the members to be driven comprising rings contacting with each other interposed between the hob and the shaft, at least two keys fixed the one of the shaft the other in the hob and able to penetrate in slots provided in the rings, said rings being engaged alternatively on the key of the shaft and on the key of the hob; means for adjusting the axial clearance of the rings.

8. A friction driving device wherein a driving rotating shaft supports a hob connected with the members to be driven comprising rings contacting with each other interposed between the hob and the shaft, at least two keys fixed the one on the shaft, the other in the hob and able to penetrate in slots provided in the rings, said ring being engaged alternatively on key of the shaft and on the key of the hob; means for adjusting the axial clearance of the rings, the extreme rings presenting each an outer plane face perpendicular to the shaft axis and an inner frustoconical face, stops fixed on the driving device on which bear said plane faces of the extreme rings; all the other rings presenting each two frustoconical contacting faces, the axis of said frustocones being that of the shaft and the angle between the generatrices and said axis being so determined in accordance with the weight of the hob and the coefficient of friction of the contacting faces, that the driving strain may have a predetermined value.

9. A friction driving device wherein a driving rotating shaft supports a hob connected with the members to be driven comprising rings contacting with each other interposed between the hob and the shaft, at least two keys fixed the one on the shaft the other in the hob and able to penetrate in slots provided in the rings, said rings being engaged alternatively on the key of the shaft and on the key of the hob; means for adjusting the axial clearance of the rings, some of the contacting faces of the rings being plane and perpendicular to the axis the other faces being frustoconical; the axis of said frustocones being that of the shaft and the angle between the generatrices and said axis being so determined in accordance with the weight of the hob and the coefficient of friction of the contacting faces that the driving strain may have a predetermined value.

10. A friction driving device as claimed in claim 4, the means for adjusting the axial clearance of the ring consisting in a split nut screwed in the hob, said nut comprising in its split a metallic cone provided with a screw, and able when said screw is adjusted, to penetrate in the slot and extend the nut for blocking it.

ANDRÉ LEON VICTOR
CLEMENT DEBRIE.